United States Patent
Meyer et al.

(10) Patent No.: US 12,491,676 B2
(45) Date of Patent: Dec. 9, 2025

(54) METHOD FOR MANUFACTURING A FINISHED PART

(71) Applicant: Safran Seats, Plaisir (FR)

(72) Inventors: Thomas Meyer, Saint Ismier (FR);
Agnès Exertier, Nantes (FR); Pascal Thobie, Treillieres (FR); Jérémy Cailleteau, Saint-Aout (FR)

(73) Assignee: Safran Seats, Plaisir (FR)

( * ) Notice: Subject to any disclaimer, the term of this patent is extended or adjusted under 35 U.S.C. 154(b) by 251 days.

(21) Appl. No.: 17/762,331

(22) PCT Filed: Oct. 13, 2020

(86) PCT No.: PCT/EP2020/078710
§ 371 (c)(1),
(2) Date: Mar. 21, 2022

(87) PCT Pub. No.: WO2021/074115
PCT Pub. Date: Apr. 22, 2021

(65) Prior Publication Data
US 2022/0388221 A1    Dec. 8, 2022

(30) Foreign Application Priority Data

Oct. 16, 2019  (FR) ..................... 1911520

(51) Int. Cl.
*B29C 51/16*    (2006.01)
*B29C 51/08*    (2006.01)
(Continued)

(52) U.S. Cl.
CPC ............ *B29C 51/16* (2013.01); *B29C 51/082* (2013.01); *B29K 2027/06* (2013.01);
(Continued)

(58) Field of Classification Search
CPC . B29C 51/16; B29C 51/082; B29C 2791/001; B29K 2027/06; B29K 2055/02;
(Continued)

(56) References Cited

U.S. PATENT DOCUMENTS 5,908,524 A * 6/1999 Masui .................. B29C 70/086
156/212
6,136,415 A    10/2000 Spengler
(Continued)

FOREIGN PATENT DOCUMENTS

| FR | 2840246 A1 | 12/2003 |
|---|---|---|
| JP | 2007090764 A * | 4/2007 |
| JP | 2008055848 A * | 3/2008 |

OTHER PUBLICATIONS

Machine Translation of Shigeru Co Ltd, JP2007090764A (EPO Google) (Year: 2024).*
(Continued)

*Primary Examiner* — Cynthia L Schaller
(74) *Attorney, Agent, or Firm* — Kilpatrick Townsend & Stockton LLP

(57) ABSTRACT

The invention relates to a method for manufacturing a finished part comprising:
  a step of placing a trimmed finishing shell inside a heated mold chosen from a first mold referred to as a female mold and a second mold referred to as a male mold in the form of a punch,
  a step of heating a structural part made of a composite material up to its melting point,
  a step of placing the structural part on the finishing shell,
  a step of shaping the structural part against the finishing shell by means of the male mold in the form of a punch cooperating with the female mold, such that the fin-
(Continued)

[Fig. 2c]

ishing shell is fixed to the structural part that was shaped to obtain the finished part.

9 Claims, 4 Drawing Sheets

(51) Int. Cl.
  *B29K 27/06* (2006.01)
  *B29K 55/02* (2006.01)
  *B29L 31/30* (2006.01)
(52) U.S. Cl.
  CPC ... *B29K 2055/02* (2013.01); *B29L 2031/3026* (2013.01); *B29L 2031/3076* (2013.01)
(58) Field of Classification Search
  CPC ............ B29K 2069/00; B29K 2081/04; B29K 2307/04; B29K 2309/08; B29L 2031/3026; B29L 2031/3076
  See application file for complete search history.

(56) References Cited

U.S. PATENT DOCUMENTS

| | | | |
|---|---|---|---|
| 2011/0134655 A1* | 6/2011 | Ohtani | F21V 3/00 977/932 |
| 2014/0148072 A1* | 5/2014 | Nagakura | B29C 70/08 264/119 |
| 2018/0345570 A1 | 12/2018 | Sepasi | |
| 2019/0389102 A1* | 12/2019 | Heikkila | B29C 45/14786 |

OTHER PUBLICATIONS

Machine Translation of Kasai Kogyo KK, JP2008055848A (EPO/Google) (Year: 2024).*

International Patent Application No. PCT/EP2020/078710, International Search Report (with English translation) and Written Opinion, dated Dec. 15, 2020.

* cited by examiner

[Fig. 1a]
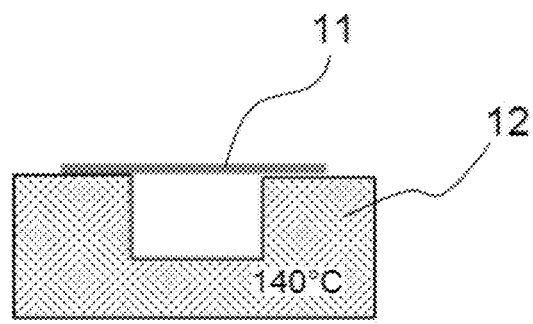
[Fig. 1b]
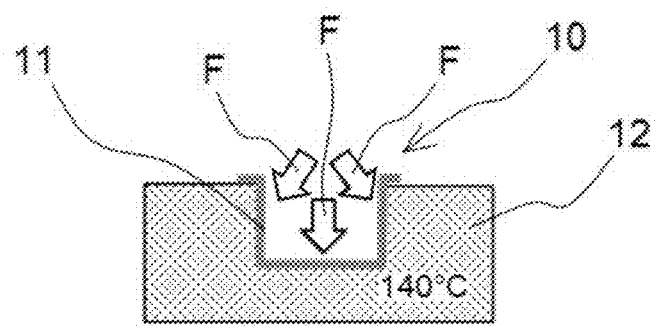
[Fig. 1c]
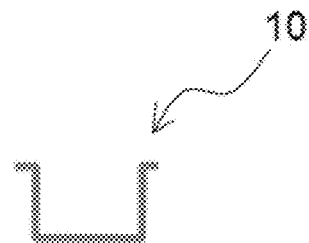

[Fig. 2a]
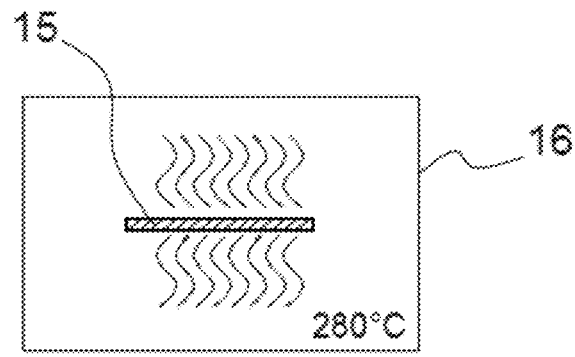
[Fig. 2b]
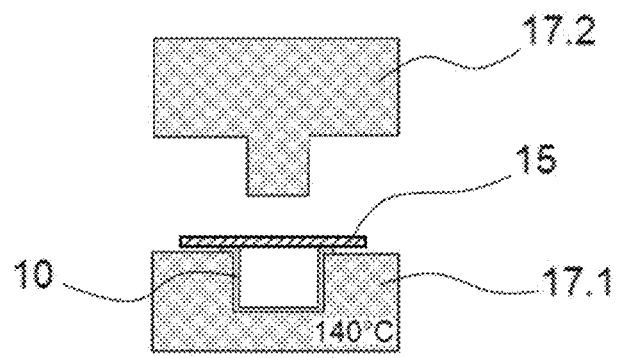
[Fig. 2c]
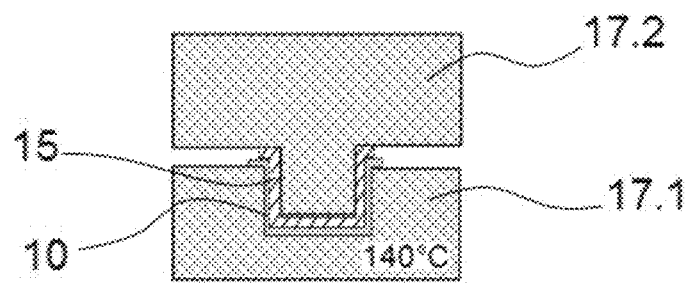

[Fig. 2d]
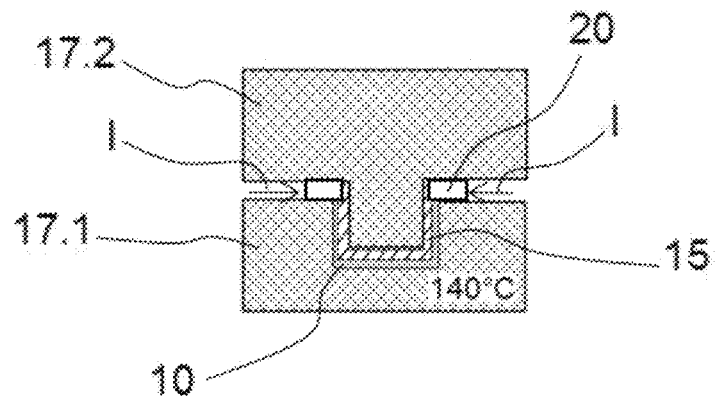
[Fig. 2e]
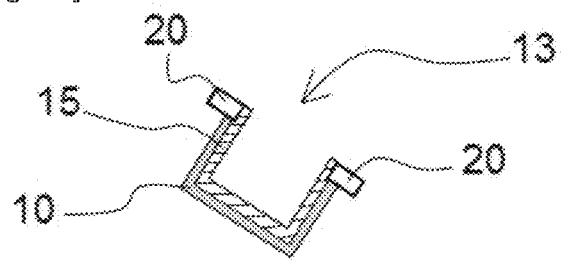
[Fig. 3]
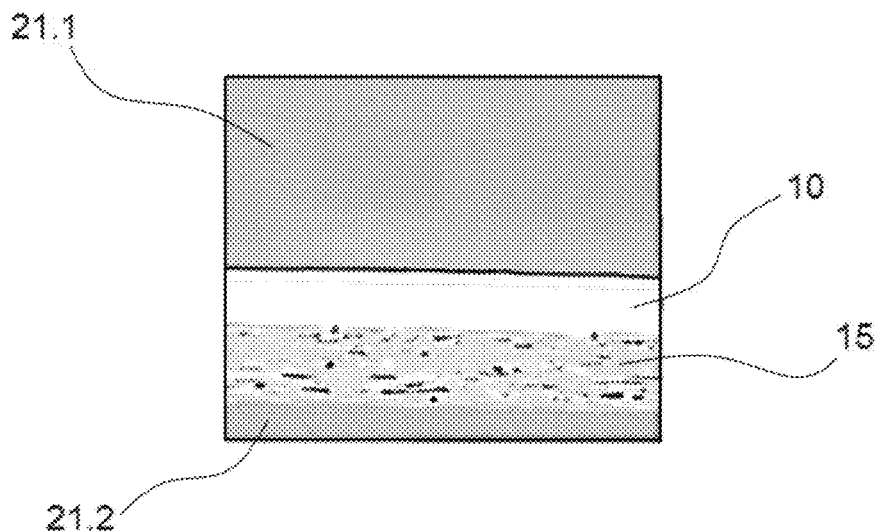

[Fig. 4]
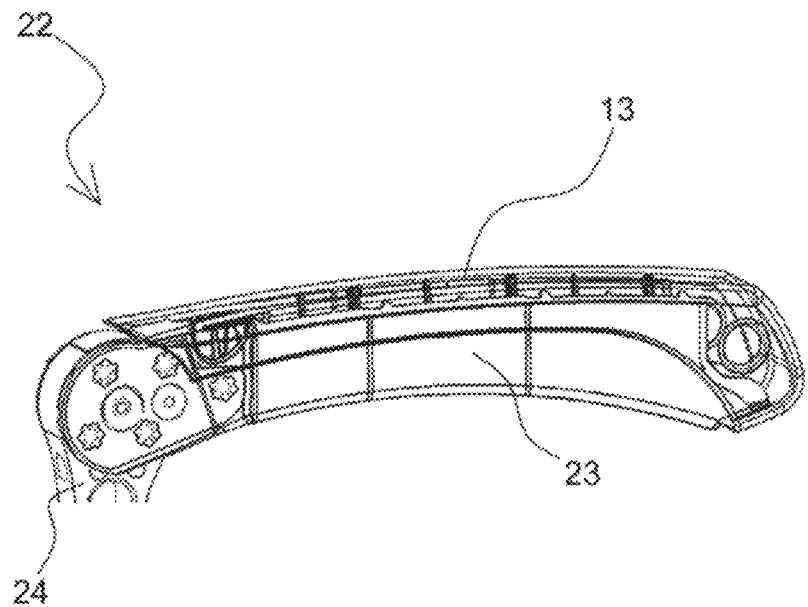

METHOD FOR MANUFACTURING A FINISHED PART

CROSS-REFERENCE TO RELATED APPLICATIONS

This application is a national stage application of International Patent Application PCT/EP2020/078710, filed on Oct. 13, 2020 and titled "Method For Manufacturing A Finished Part," which is related to and claims priority to France Patent Application No. 1911520, filed on Oct. 16, 2019, both of which are hereby incorporated by reference in their entireties.

The present invention relates to a method for manufacturing a finished part. The invention finds a particularly advantageous, but not exclusive, application for airplane seat parts for business class or economy class, such as armrest covers.

An armrest cover can be made by a method of stamping a structural part made of a composite material. The finish can then be carried out during a manual step of adding a shell of the desired color and texture, which induces a long and costly manufacture of the parts.

Furthermore, certain methods make it possible to cover a structural part with a finishing film. However, this very thin film (around 0.2 mm) tends to crease and is therefore not suitable for parts with complex shapes, such as armrest covers.

The invention aims at effectively remedying these drawbacks by proposing a method for manufacturing a finished part comprising:
- a step of producing a finishing shell for an internal or external face of the finished part, said finishing shell being made of plastic material,
- a step of placing the trimmed finishing shell inside a heated mold chosen from a first mold, so-called female mold, and a second mold, so-called male punch-shaped mold, said female mold having a shape complementary to that of the male mold,
- a step of heating a structural part made of a composite material to its melting temperature,
- a step of placing the structural part on the finishing shell,
- a step of putting in shape the structural part against the finishing shell by means of the male punch-shaped mold cooperating with the female mold, in such a way that the finishing shell is joined with the formed structural part to obtain the finished piece.

The invention thus makes it possible, by arranging the finishing shell in the mold for forming the structural part, to obtain a finished part in a single operation. The invention thus makes it possible to reduce the duration for manufacturing the finished part without impacting its method of stamping production. The invention also makes it possible to adapt the finish of the part (color or texture of the finishing shell) according to the geometry of the structural part. The invention also makes it possible, thanks to the preheating of the structural part, to obtain good adhesion between the structural part and the finishing shell.

According to one embodiment, said method further comprises a plastic injection step during the stamping step so as to form a border and/or ribs on the structural part.

According to one embodiment, the plastic material of the finishing shell, the composite material of the structural part and the injected plastic material are made from a plastic material of the same nature.

According to one embodiment, the plastic material of the finishing shell, the composite material of the structural part and the injected plastic material are based on polycarbonate, PVC ("Polyvinyl chloride"), PPS (polyphenylene sulphide) or ABS ("Acrylonitrile Butadiene Styrene").

According to one embodiment, the finishing shell is made by thermoforming or thermocompression and trimmed.

According to one embodiment, the finishing shell is produced by thermoforming or thermocompression directly on the female mold or the male mold.

According to one embodiment, the heating of the structural part is carried out by means of an infrared oven.

According to one embodiment, a temperature of the mold in which the finishing shell is placed is lower than the melting temperature of the composite material of the structural part.

According to one embodiment, the structural part is formed from several layers of composite material stacked on top of each other.

According to one embodiment, the finishing shell has a thickness between 0.5 mm and 1.2 mm, and preferably being about 1 mm.

According to one embodiment, the structural part has a thickness between 1 mm and 3 mm and is preferably about 2.5 mm.

According to one embodiment, the finished part is a structural and decorative aircraft seat part such as a portion of an armrest, a video cover, a backrest, a meal table.

The invention further relates to a finished part obtained with the method as defined above.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIGS. 1a to 1c illustrate the different steps of the thermoforming process according to the invention for obtaining a finishing shell made of a plastic material;

FIGS. 2a to 2e illustrate the various steps of the stamping process according to the invention making it possible to obtain a finished part from a finishing shell and a structural part;

FIG. 3 is a detailed sectional view illustrating the interface zone between the composite material of the structural part and the plastic material of the finishing shell;

FIG. 4 is a perspective view of an armrest having a cover obtained by realizing the stamping method according to the present invention.

It should be noted that, in the figures, the structural and/or functional elements common to the different embodiments may have the same references. Thus, unless otherwise stated, such elements have identical structural, dimensional and material properties.

FIGS. 1a to 1c show the steps for producing a finishing shell 10. For this purpose, a plate 11 made of a plastic material, in particular polycarbonate, is heated to a temperature between 180° C. and 230° C., in particular of about 200° C. In order to be able to produce complex shapes, the plate 11 has a thickness of between 0.5 mm and 1.2 mm and preferably being of about 1 mm. "About" means a possible variation of plus or minus 105 around the indicated value.

The heated plate 11 is placed in position inside a mold 12 by an operator or by means of a robot, as shown in FIG. 1a. The temperature of the mold 12 is lower than that of the heated plate 11. The temperature of the mold 12 is for example between 90° C. and 150° C. and is preferably about 140° C.

The heated plate 11 is then put in shape by thermoforming or thermocompression under pressure or under vacuum. In the case of a thermoforming phase under pressure, a pressurized air volume cage arranged above the mold 12 applies pressure forces F on the plate 11 so as to deform the plate 11 to make it fit the walls of the mold 12, as shown in FIG. 1b. In the case of a vacuum thermoforming phase, the pressure forces F are generated by a source of depression and holes in the mold 12. The pressure applied to the plate 11 is for example between 1 and 6 bars. The thermoforming phase lasts for example about one minute.

At the end of the thermoforming phase, a plate 11 is obtained with a rectangular external shape corresponding to the shape of the mold 12.

Then a step of trimming the plate 11 shaped by thermoforming is performed. This trimming step is a machining operation according to which the formed plate 11 is held on a former and is cut along its outer periphery. The trimming step could for example be carried out by using a 5-axis machining cutter or any other cutting tool suitable for the application.

At the end of the trimming step, a finishing shell 10 is obtained, visible in FIG. 1c. The finishing shell 10 ensures the finishing of an internal or external face of a finished part 13. The finished part 13 could for example be a part of an airplane seat.

The method of manufacturing the finished part 13 from the trimmed finishing shell 10 and a structural part 15 is described with reference to FIGS. 2a to 2e.

The structural part 15 is formed from several layers of composite material stacked on top of each other. The layers of composite material may be mechanically bonded together by spot welds produced in particular by ultrasound.

The fibers, for example glass or carbon fibers, may have different orientations from one layer of material to another in order to optimize the mechanical strength of the whole. The structural part 15 has a thickness between 1 mm and 3 mm and preferably about 2.5 mm.

The structural part 15 is heated inside a furnace 16 up to its melting temperature, as shown in FIG. 2a. The melting temperature depends on the material used and is for example between 250° C. and 300° C. In the example shown, the melting temperature of the plastic material used is about 280° C.

The heating of the structural part 15 is preferably carried out by means of an infrared oven 16. The duration of the heating phase may be for example about 2 minutes.

The trimmed finishing shell 10 is previously placed inside a first mold 17.1 which is heated. The first mold 17.1, so-called "female mold", has a shape complementary to a second mold 17.2, so-called "male mold" in the form of a punch.

As illustrated in FIG. 2b, once the structural part 15 has reached its melting temperature, an operator or a robot places the structural part 15 onto the finishing shell 10.

As shown in FIG. 2c, the structural part 15 is put in shape against the finishing shell 10 by means of the male punch-shape mold 17.2 cooperating, in a closed state, with the female mold 17.1, such that the finishing shell 10 joins with the formed structural part 15 to obtain a finished part 13. The stamping process makes it possible to ensure good compaction of the composite material, so that the mechanical qualities of the structural part 15 are maintained despite the addition of the finishing shell 10.

The temperature of the female mold 17.1 is lower than the melting temperature of the composite material of the structural part 15, in order to promote the cooling of the finished part 13. The temperature of the female mold 17.1 is for example between 90° C. and 150° C. and is preferably around 140° C.

As illustrated in FIG. 2d, the method may also include a plastic injection step, along the arrows I, during the stamping step so as to form a border and/or ribs 20 on the structural part 15. In other words, the plastic material injection step can occur when the male mold 17.2 is in the closed state. The plastic material is injected between the female mold 17.1 and the male mold 17.2. The closing time of the male mold 17.2 is for example about 90 seconds (this includes the injection phase).

As illustrated in FIG. 2e, the finished part 13 is ejected at the end of the injection step.

Advantageously, the plastic material of the finishing shell 10, the composite material of the structural part 15, and the injected plastic material are made from a plastic material of the same nature, in particular based on the same material. This match between the materials used makes it possible to optimize the adhesion at the connection interfaces between the various parts assembled.

The plastic material of the finishing shell 10, the composite material of the structural part 15 and the injected plastic material are in this case based on polycarbonate. Alternatively, it is possible to use another type of plastic material, such as PVC (for "Polyvinyl chloride"), PPS (polyphenylene sulfide) or ABS (for "Acrylonitrile Butadiene Styrene"), or any other plastic material suitable for the application.

It should be noted that the finishing shell 10 and the structural part 15 can be produced independently of one another. Thus, the finishing shells 10 can be produced on another production line before being used for the manufacture of the finished part 13. In other words, the finishing shell 10 placed inside the mold 17.1 at the start of the process is a pre-formed and cooled part. The duration of production of the finishing shells 10 therefore has no impact on the duration of production of the finished part 13.

FIG. 3 shows a cross section of the finished part 13 which is embedded between two layers of resins 21.1, 21.2 to facilitate the cutting of the material sandwiched between these two layers 21.1, 21.2. This figure highlights the good adhesion between the composite material of the structural part 15 and the plastic material of the finishing shell 10.

This adhesion between the materials is favored by the heating of the structural part 15 and the finishing shell 10 before the stamping phase as well as by the match between the chosen plastic materials which are of the same nature.

As shown in FIG. 4, the finished part 13 may be a portion of an armrest 22 of complex shape arranged around another portion 23 of the armrest 22. The finished part 13 has not only an aesthetic function insofar as it also has a mechanical function of recovery and transmission of forces. The portion 23 of the armrest 22 is rotatably mounted with respect to a crosshead 24 of a seat. The seat may be an economy-type multi-seat seat or a business-type seat.

Alternatively, the finished part 13 is another structural and decorative aircraft seat part such as a video cover, a backrest, a meal table, or the like.

The method was carried out with a positioning of the finishing shell 10 on the female mold 17.1. Alternatively, the finishing shell 10 can be positioned on the male mold 17.2 in the case where the finishing covers an internal face of the finished part 13. A finishing shell 10 can also be positioned on the female mold 17.1 and the male mold 17.2 in case the finish covers an internal face and an external face of the finished part 13.

Alternatively, the finishing shell 10 is made by thermoforming or thermocompression directly on the female mold 17.1 or the male mold 17.2.

Of course, the different characteristics, variants and/or embodiments of the present invention can be associated with each other in various combinations insofar as they are not incompatible with or exclusive of one another.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A method for manufacturing a finished part comprising:
    a step of producing a finishing shell of an internal or external face of the finished part, said finishing shell being made of plastic material,
    the step of producing the finishing shell comprising:
        a step of heating a plate made of a plastic material to a temperature between 180° C. and 230° C., the plate having a thickness of about 1 mm,
        a step of placing the heated plate in a position inside a first mold, the temperature of the first mold being lower than the temperature of the heated plate, the temperature of the first mold being between 90° C. and 150° C.,
        a step of putting the heated plate in shape within the first mold,
    a step of trimming the plate to obtain a trimmed finishing shell,
    a step of placing the trimmed finishing shell inside a heated second mold chosen from a female mold and a male mold in a shape of a punch, said female mold having a shape complementary to the shape of the male mold, a temperature of the heated second mold in which the finishing shell is placed is lower than a melting temperature of a composite material of a structural part in order to promote cooling of the finished part, the temperature of the heated second mold being between 90° C. and 150° C.,
    a step of heating the structural part made of the composite material up to the melting temperature of the composite material of the structural part, the melting temperature of the composite material of the structural part being between 250° C. and 300° C.,
    a step of placing the structural part on the finishing shell,
    a step of shaping the structural part against the finishing shell by means of the male mold cooperating with the female mold, so that the finishing shell joins with the structural part formed to obtain the finished part,
    wherein the method further comprises a plastic material injection step during the step of shaping the structural part against the finishing shell so as to form a border on the structural part, wherein the plastic material injection step comprises laterally injecting a plastic material between the female mold and the male mold.

2. The method according to claim 1, wherein the plastic material of the finishing shell, the composite material of the structural part and the injected plastic material are made from a same type of plastic material.

3. The method according to claim 2, wherein the plastic material of the finishing shell, the composite material of the structural part and the injected plastic material comprises polycarbonate, PVC ("Polyvinyl chloride"), PPS (polyphenylene sulfide), or ABS ("Acrylonitrile Butadiene Styrene").

4. The method according to claim 1, wherein the heating of the structural part is carried out by means of an infrared oven.

5. The method according to claim 1, wherein the structural part is formed from several layers of composite material stacked on top of each other.

6. The method according to claim 1, wherein the structural part has a thickness between 1 mm and 3 mm.

7. The method according to claim 1, wherein the finished part is a structural and decorative aircraft seat part.

8. The method according to claim 7, wherein the structural and decorative aircraft seat part is at least one of a portion of an armrest, a cover video, a backrest, or a meal table.

9. A method for manufacturing a finished part comprising:
    a step of producing a finishing shell of an internal or external face of the finished part, said finishing shell being made of plastic material,
    the step of producing the finishing shell comprising:
        a step of heating a plate made of a plastic material to a temperature between 180° C. and 230° C., the plate having a thickness of about 1 mm,
        a step of placing the heated plate in a position inside a first mold, the temperature of the first mold being lower than the temperature of the heated plate, the temperature of the first mold being between 90° C. and 150° C.,
        a step of putting the heated plate in a shape within the first mold,
    a step of trimming the plate to obtain a trimmed finishing shell,
    a step of placing the trimmed finishing shell inside a second heated mold chosen from a female mold and a male mold in a shape of a punch, said female mold having a shape complementary to the shape of the male mold, a temperature of the second heated mold in which the finishing shell is placed is lower than a melting temperature of a composite material of a structural part in order to promote cooling of the finished part, the temperature of the heated mold being between 90° C. and 150° C.,
    a step of heating the structural part made of the composite material up to the melting temperature of the composite material of the structural part, the melting temperature of the composite material of the structural part being between 250° C. and 300° C.,
    a step of placing the structural part on the finishing shell,
    a step of shaping the structural part against the finishing shell by means of the male mold cooperating with the female mold, so that the finishing shell joins with the structural part formed to obtain the finished part.

* * * * *